United States Patent
Felis

(10) Patent No.: US 8,668,391 B2
(45) Date of Patent: Mar. 11, 2014

(54) MULTIPLE-ROW BALL BEARING ARRANGEMENT

(75) Inventor: Norbert Felis, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/512,986

(22) PCT Filed: Nov. 30, 2010

(86) PCT No.: PCT/EP2010/068531
§ 371 (c)(1),
(2), (4) Date: May 31, 2012

(87) PCT Pub. No.: WO2011/067253
PCT Pub. Date: Jun. 9, 2011

(65) Prior Publication Data
US 2012/0237151 A1    Sep. 20, 2012

(30) Foreign Application Priority Data
Dec. 5, 2009  (DE) .......................... 10 2009 057 192

(51) Int. Cl.
*F16C 33/40* (2006.01)
(52) U.S. Cl.
USPC ......................................... 384/512; 384/523
(58) Field of Classification Search
USPC ................... 384/504, 523–534, 512
See application file for complete search history.

(56) References Cited

U.S. PATENT DOCUMENTS

| | | | | |
|---|---|---|---|---|
| 4,560,291 A | * | 12/1985 | Bonengel et al. | 384/533 |
| 5,199,801 A | * | 4/1993 | Grehn et al. | 384/506 |
| 5,387,041 A | | 2/1995 | Lederman | |
| 5,906,441 A | | 5/1999 | Seki | |
| 7,938,584 B2 | * | 5/2011 | Felis et al. | 384/523 |

FOREIGN PATENT DOCUMENTS

| | | |
|---|---|---|
| DE | 10 2006 031 956 A1 | 1/2008 |
| DE | 60 2005 003 458 T2 | 9/2008 |
| EP | 1 361 373 A1 | 11/2003 |
| WO | WO 2005090809 A1 * | 9/2005 |

* cited by examiner

Primary Examiner — Thomas R Hannon
(74) Attorney, Agent, or Firm — Lucas & Mercanti, LLP

(57) ABSTRACT

A multiple-row ball bearing arrangement, which has at least one inner bearing ring and at least one outer bearing ring which are coaxially disposed on a longitudinal axis. The multiple-row ball bearing arrangement also has a plurality of balls disposed between the inner and the outer bearing rings in at least one first ball row and a second ball row adjacent to the first ball row, and a first cage for guiding the balls of the first ball row and a second cage for guiding the balls of the second ball row. The first and the second cage each have a first and a second cage side ring. The first cage side ring of the first cage and the second cage side ring of the second cage are adjacent to each other and, at least in some sections, are arranged so as to overlap along the longitudinal axis.

19 Claims, 7 Drawing Sheets

MULTIPLE-ROW BALL BEARING ARRANGEMENT

CROSS-REFERENCE TO RELATED APPLICATIONS

This application is a 371 of PCT/EP2010/068531 filed Nov. 30, 2010, which in turn claims the priority of DE 10 2009 057 192.2 filed Dec. 5, 2009. The priority of both applications is hereby claimed and both applications are incorporated by reference herein.

FIELD OF THE INVENTION

The invention relates to a multiple-row ball bearing arrangement.

Although applicable to arbitrary bearings and bearing arrangements, the present invention and the problems underlying it are explained below in more detail with reference to an angular-contact ball bearing.

BACKGROUND OF THE INVENTION

A multiple-row angular-contact ball bearing can be used in the area of a bearing point of a shaft for a high level of bearing strength. In the case of said multiple-row angular-contact ball bearing, a plurality of ball rows, which are able to absorb the operating axial and radial loads, are arranged between an inner and an outer bearing ring. Instead of this, a plurality of single-row angular-contact ball bearings, in each case, with a ball row can also be arranged coaxially directly one behind the other for a high level of bearing strength.

A multiple-row angular-contact ball bearing is described, for example, in DE 60 2005 003 458 T2. A cage is provided to guide the balls for each of the two ball rows of the bearing described here. Because a sufficient clearance is necessary between the two bearing cages in order to avoid contact between them, the multiple-row angular-contact ball bearing described in DE 60 2005 003 458 T2 has to be a certain installation size along its axial direction. This makes decreasing the axial extension and the weight of the bearing and reducing the space necessary for the installation thereof in a housing more difficult.

SUMMARY OF THE INVENTION

The present invention provides a multiple-row ball bearing arrangement which has a reduced space requirement and a reduced installation size in comparison with previously known ball bearing arrangements.

Accordingly, the invention relates to a multiple-row ball bearing arrangement, which has at least one inner bearing ring, at least one outer bearing ring and a plurality of balls which are arranged between the at least one inner bearing ring and the at least one outer bearing ring in at least one first ball row and one second ball row, which is adjacent the first ball row. The at least one inner and at least one outer bearing ring, in this case, are arranged coaxially on a longitudinal axis. Over and above this, the multiple-row ball bearing arrangement has a first cage for guiding the balls of the first ball row and a second cage for guiding the balls of the second ball row. Ira this case the first and the second cage have, in each case, a first and a second cage side ring. The first cage side ring of the first cage and the second cage side ring of the second cage are adjacent each other and are arranged so as to overlap at least in sections along the longitudinal axis.

The idea of the present invention is that the first cage side ring of the first cage and the second cage side ring of the second cage are arranged in such a manner to reduce the axial installation size of a multiple-row ball bearing arrangement that they overlap in one direction along the longitudinal axis, at least in sections. Consequently, the axial installation space required for the two overlapping cage side rings does not correspond to the sum of the axial extensions of the two cage side rings, but is smaller than said sum. This means that a reduction in the necessary axial dimension of the multiple-row ball bearing arrangement is achieved, as a result of which the weight of the multiple-row ball bearing arrangement is also able to be reduced. At the same time, bearing seats on which the multiple-row ball bearing arrangement rests for example in a housing can also have smaller dimensions, as a result of which material is saved once again and the weight of the housing is able to be reduced.

In addition, each of the ball rows has its own cage, which has an advantageous effect when adjacent ball rows rotate at different speeds, as can occur, for example, in certain load conditions of the multiple-row ball bearing arrangement.

As claimed in a further development, the first and/or the second cage have in each case a plurality of webs which connect the first and second cage side rings associated with the respective cage in such a manner that pockets, which are defined in each case by two adjacent webs, one circumferential section of the first cage side ring and one circumferential section of the second cage side ring, are realized for accommodating the balls. Individual balls of a ball row are separated from each other by the webs during the operation of the multiple-row ball bearing arrangement such that rubbing contact between adjacent balls is advantageously able to be avoided.

In an advantageous development, the pockets completely enclose a ball in a plane through the mid-point of the ball. This means that particularly favorable mechanical characteristics of the bearing cages can be achieved with a view to the cages having sufficient stability under load and, at the same time, a low own weight.

As claimed in a further development, the circumferential section of the first cage side ring and the circumferential section of the second cage side ring of the first and/or second cage are arranged completely on different sides of a graduated circle surface of the ball row associated with the cage and do not touch the graduated circle surface. A graduated circle surface of a ball row, in this case and below, is understood as a cylindrical surface, the axis of which matches the longitudinal axis, and which includes the graduated circle of said ball row. Because the axial extension of the balls of a ball row is at its largest in the region of the graduated circle surface of said ball row, a particularly space-saving cage is able to be achieved as a result of the circumferential sections being arranged in each case completely on one side of the graduated circle surface and not touching the graduated circle surface. In addition, as a result of the circumferential sections being arranged completely on different sides of the graduated circle surface, the balls, in a favorable manner, are able to be enclosed by the respective pocket. Consequently, a narrow design of the cage and consequently at the same time also a smaller space requirement for the ball bearing arrangement can be achieved, and closed pockets for the balls can be provided in which the balls are held in a captive manner. At the same time, the material strength of said circumferential sections of the cage side rings required for a necessary strength of the cage can be ensured.

In an advantageous development, the circumferential sections are arranged, over and above this, not in the direct vicinity of the graduated circle surface, but neither do they touch the graduated circle surface when the mid-point of a ball, which is accommodated in the pocket, is moved with reference to the pocket within the framework of a slight play of the ball in the pocket.

As claimed in a further advantageous development, the circumferential sections are arranged in a radial plane, which runs through a mid-point of a ball accommodated in the pocket and includes the longitudinal axis, outside an angular region, which is symmetrical to the track of the graduated circle surface in this plane and is measured from the mid-point of a ball accommodated in the pocket and to the two sides with reference to the track of the graduated circle surface, in other words radially with reference to the longitudinal axis to the inside and to the outside is at least 15 degrees, in a preferred manner, however, at least 25 degrees. In this way, a comparatively large clearance between the circumferential sections and the graduated circle surface is achieved, and the circumferential sections are accommodated in a region of the ball circumference in which the axial extension of the ball is already considerably smaller than at the height of the graduated circle. Encompassing the ball by the circumferential sections outside the direct surrounding area of the graduated circle surface consequently allows for a reduced dimension of the cages in the axial direction. Reduced cage dimensions also facilitate in a considerable manner a reduction in the clearance between rows between the ball rows of a multiple-row ball bearing arrangement. Because, however, the size of the angular region, outside of which the circumferential sections are advantageously arranged as claimed in this development, is determined among other things by the exact cross-sectional geometry of the circumferential sections and by the geometry of the bearing rings, developments of the multiple-row ball bearing arrangement as claimed in the invention are also conceivable where said angular regions deviate from the given numerical values.

As claimed in another further development, the circumferential section of the first cage side ring and the circumferential section of the second cage side ring of the first and/or second cage are arranged substantially opposite each other with reference to the mid-point of a ball of the ball row associated with the cage. This means that the ball accommodated in the pocket is encompassed by the two circumferential sections of the cage side rings in the region of a diameter, which is advantageous for secure guiding of the balls and captive accommodation of the balls in the pockets of the cage during the assembly.

As claimed in a further development, the circumferential section of the first cage side ring of the first cage and the circumferential section of the second cage side ring of the second cage are both arranged completely on the same side of the graduated circle surface of the first ball row and are both arranged completely on the same side of the graduated circle surface of the second ball row. This means that, for example, in the case of multiple-row ball bearing arrangements where the graduated circle of a ball row has a diameter that is clearly larger than the graduated circle of an adjacent ball row, the circumferential section of the first cage side ring of the first cage and the circumferential section of the second cage side ring of the second cage are arranged completely between the graduated circle surfaces of the first and the adjacent second ball row such that a particularly space-saving arrangement of the cages in the axial direction is possible in this way.

As claimed in a further development, the graduated circle of the second ball row has a larger diameter than the graduated circle of the first ball row.

In one development of the multiple-row ball bearing arrangement, the cage side rings of the first and of the second cage are realized in the shape of an annulus and it is provided that the first cage side ring of the first cage has a larger inner and outer diameter than the second cage side ring of the first cage and/or that the first cage side ring of the second cage has a larger inner and outer diameter than the second cage side ring of the second cage. With regard to the resistance of the cage to mechanical loads and with regard to a simple producibility of the cage, an annulus-shaped design of the cage side rings is advantageous.

In a further development, the first cage side ring of the first cage and the second cage side ring of the second cage are arranged so as to overlap along their entire circumference in the direction of the longitudinal axis.

In yet a further development, the first cage side ring of the first cage has an inner diameter which is larger than the outer diameter of the second cage side ring of the second cage. In this way, the first cage side ring of the first cage can encompass the second cage side ring of the second cage along the circumference in such a manner that the first cage side ring of the first cage and the second cage side ring of the second cage overlap without the first and the second cage touching.

As claimed in one development, the first and/or the second cage side ring of one of the cages have in each case an axial defining surface which points away from the center of the ball bearing arrangement in an axial direction, and in particular is realized at a right angle with respect to the longitudinal axis. This is favorable in order to avoid the respective cage projecting beyond the axial ends or end faces of the bearing rings, and at the same time is advantageous in order to utilize the installation space available for the cages.

As claimed in an advantageous development of the multiple-row ball bearing arrangement, the first cage side ring of the first cage has an axial defining surface which points in the direction of the second ball row and forms part of a toroidal surface. In addition or as an alternative to this, in this development the second cage side ring of the second cage has an axial defining surface which points in the direction of the first ball row and forms parts of another toroidal surface. This means that the axial space requirement of the multiple-row ball bearing arrangement is able to be reduced even further because as a result of this type of shaping of said axial defining surfaces of the cage side rings, the first cage side ring of the first cage and the second cage side ring of the second cage are able to overlap even further without the first cage side ring of the first cage frictionally touching the balls of the second ball row or the second cage side ring of the second cage frictionally touching the balls of the first ball row. This means that it is possible to reduce the clearance between rows even further, measured along the longitudinal axis, between a mid-point of a ball of the first ball row and a mid-point of a ball of the second ball row and in this way provide a multiple-row ball bearing arrangement with even further reduced installation space.

As claimed in an advantageous development, the axial defining surface of the first cage side ring of the first cage corresponds substantially to a toroidal surface which is generated by a ball of the second ball row as it rolls as an envelope surface of its spherical surfaces enlarged by play, in particular by slight play, in all of its possible positions. In addition or as an alternative to this, as claimed in this development, the axial defining surface of the second cage side ring of the second cage corresponds substantially to a toroidal surface which is generated by a ball of the first ball row as it rolls as an envelope surface of its spherical surfaces enlarged by play, in particular by slight play, in all of its possible positions. In this development, on the one hand the balls of the second ball row are separated from the adjacent axial defining surface of the first cage side ring of the first cage, and on the other hand the balls of the first ball row are separated from the adjacent axial defining surface of the second cage side ring of the second cage only by play or, in other words, by a gap which is slight in comparison with the cross-section of the cage side rings. In this way, the space available in the multiple-row ball bearing for the first cage side ring of the first cage and the second cage side ring of the second cage is utilized in the best possible manner for accommodating the cages without resulting in any additional sliding and frictional stress on the cage side rings in the region of their axial defining surfaces. This means that a lighter, weight-saving development of the cages is achieved and at the same time the service lives thereof are extended.

As claimed in another advantageous development of the multiple-row ball bearing arrangement, the first cage side ring of the first cage has an axial defining surface which points in the direction of the second ball row and forms part of a conical surface. In addition or as an alternative to this, in this development the second cage side ring of the second cage has an axial defining surface which points in the direction of the first ball row and forms part of another conical surface. In a preferred manner, the two conical surfaces, which form the axial defining surfaces, are arranged coaxially with respect to the longitudinal axis.

As claimed in a further development, the axial defining surface of the first cage side ring of the first cage, said defining surface pointing in the direction of the second ball row, and/or the axial defining surface of the second cage side ring of the second cage, said defining surface pointing in the direction of the first ball row, are realized as planar surfaces which extend, in a preferred manner, substantially at a right angle to the longitudinal axis.

As claimed in a further development, a pocket has a defining surface, which faces a ball accommodated in the pocket and is formed from sections of a spherical surface and sections of a cylindrical surface which are connected together.

In the case of a preferred development, the axis of the cylindrical surface is aligned parallel to the longitudinal axis. The production of a cage for the multiple-row ball bearing arrangement can consequently be effected in an advantageous manner by means of an injection mold, which requires exclusively axially movable mold cores to generate the pockets for the balls. As a result, cost-efficient production of the injection mold as well as of the cage itself is possible.

In a further development, the radii of the sections of spherical surfaces and cylindrical surfaces, which connect together and form the defining surface of the pocket which faces the ball accommodated in the pocket, are identical.

As claimed in one development, a three-point snap-type device for holding the balls in the pocket is provided in the region of a pocket of the first and/or second cage, said three-point snap-type device being formed by two points of the first cage side ring and by one point of the second cage side ring and allowing the balls to be inserted into the pocket by resilient deforming in the region of the two points of the first cage side ring and of the one point of the second cage side ring. This means that a ball inserted into the pocket can be held securely in the pocket without escaping through the outer lateral surface of the cage.

In the case of a further development, the two points of the first cage side ring are different and form points of an edge, bordering the pocket, of an outer circumferential surface of the first cage side ring. In addition, in the case of this development, the one point of the second cage side ring forms a point of an edge, bordering the pocket, of an outer circumferential surface of the second cage side ring, and the two points of the first cage side ring and the one point of the second cage side ring lie on a circle which has a diameter which is smaller than the diameter of the ball accommodated in the pocket.

In a further development, the two points, different from each other, of the edge, bordering the pocket, of the outer circumferential surface of the first cage side ring are two corners of a recess in the first cage side ring, the recess having a circular segment-like form in the outer circumferential surface of the first cage side ring. If the diameter of the circle through the two points of the edge of the outer circumferential surface of the first cage side ring and through the point of the edge, bordering the pocket, of the outer circumferential surface of the second cage side ring is smaller than the diameter of the ball to be accommodated in the pocket and is suitably selected, the ball is able to be inserted, or expressed in another manner, snapped into the interior region of the pocket by the corners of the recess yielding a little in a resilient manner.

As claimed in a further development, the multiple-row ball bearing arrangement is realized as a multiple-row angular-contact ball bearing, in particular as a two-row tandem angular-contact ball bearing, with an inner bearing ring and an outer bearing ring, or as a tandem arrangement of a plurality of, in particular two, single-row angular-contact ball bearings. Because in the case of a bearing of this type, the bearing ring ribs, which are not the same height as the raceway on which the balls of a ball row roll off, but one of the ribs is lower than the other or can be omitted altogether, there is more installation space available for the cage side rings when the cage side rings are suitably arranged. Over and above this, when viewed in a plane which passes through the mid-point of the ball and includes the longitudinal axis, a larger clearance between the circumferential sections of the cage side rings and the graduated circle surface of the associated ball row can be ensured, which, once again, improves the possibilities for saving space in the axial direction.

As claimed in yet another development, a ball of the first ball row has a diameter which is different from a diameter of a ball of the second ball row.

As claimed in a preferred development, the clearance between rows between the first and the second ball row, measured in the direction of the longitudinal axis, between the mid-points of a ball of the first ball row and a ball of the second ball row, is smaller than the sum of the radii of said two balls. As a result, a multiple-row ball bearing arrangement which is constructed in a particularly narrow manner in the axial direction is obtained.

In addition, the cages of the multiple-row ball bearing arrangement, as claimed in a preferred embodiment, are in each case produced in an integral manner from a thermoplastic plastics material by means of injection molding. A particularly low own weight of the cage is achieved in this way, it is thus also possible to produce the cages in an economic manner. As claimed in an advantageous development, a glass-fiber reinforced polyimide can be used.

BRIEF DESCRIPTION OF THE DRAWINGS

The invention is explained below by way of the exemplary embodiments provided in the schematic figures, in which, in detail.

DETAILED DESCRIPTION OF THE INVENTION

Figure 1:
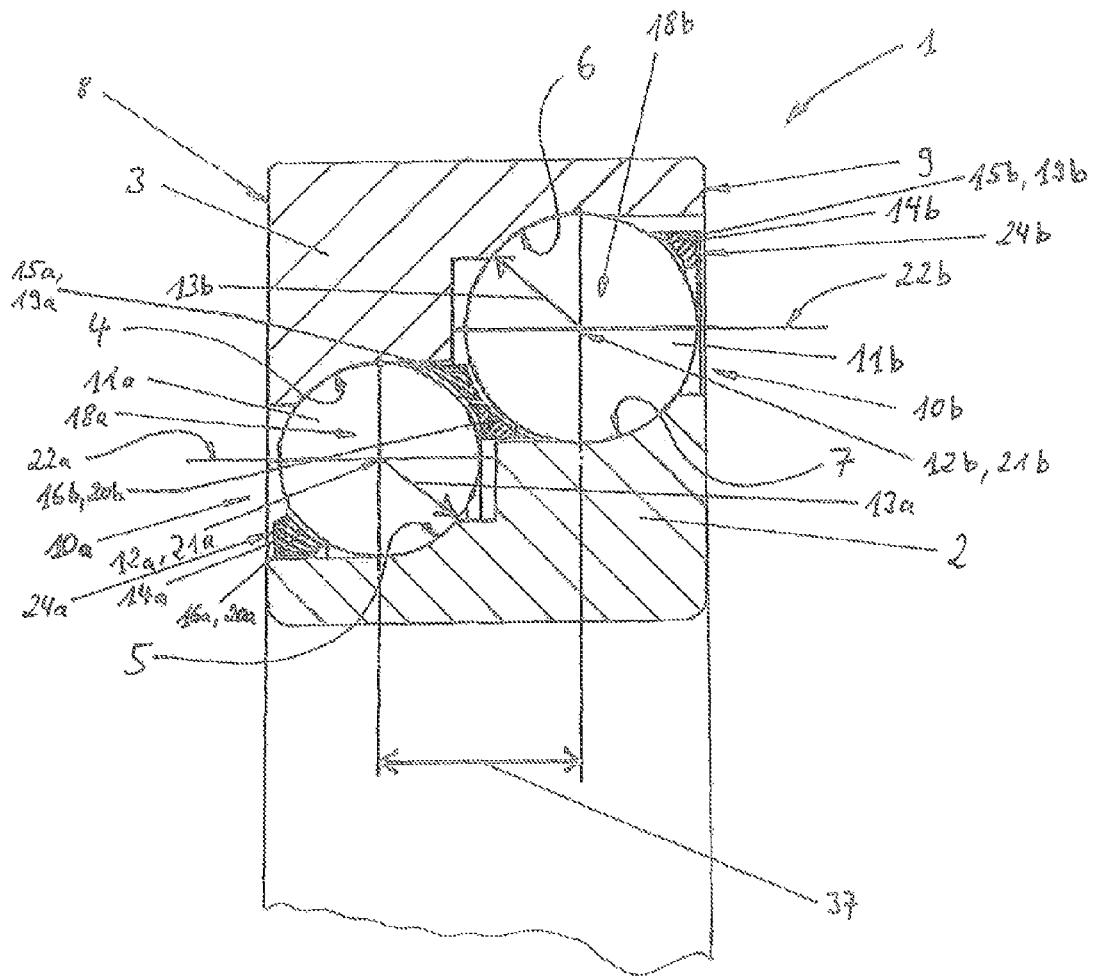
FIG. 1 shows a representation of a multiple-row ball bearing arrangement in a longitudinal section through the longitudinal axis as claimed in one exemplary embodiment of the invention.

Identical and identically operating elements and features, in so far as nothing to the contrary is specified, are provided with the same references in the figures of the drawing.

FIG. 1 shows a representation of an exemplary embodiment of a multiple-row ball bearing arrangement 1 in a section through the longitudinal axis AX thereof. In the following, the longitudinal axis AX also specifies the axial direction. As shown in FIG. 1, the multiple-row ball bearing arrangement 1 can be realized as a two-row angular-contact ball bearing 1. The multiple-row ball bearing arrangement 1 as claimed in FIG. 1 has an outer bearing ring 3 and an inner bearing ring 2 which is coaxial with respect to said outer bearing ring. The longitudinal axis AX forms the common axis of the two bearing rings 2, 3.

The outer bearing ring 3 is provided with two raceways 4, 6 which are offset with respect to each other in the axial direction AX. The inner bearing ring 2 is also provided with two raceways 5, 7 which are also arranged offset with respect to each other in the axial direction AX. Over and above this, a number of balls 11a, 11b are provided between the two bearing rings 2, 3. The balls 11a and 11b are arranged in two ball rows 10a or 10b which are guided in raceways 5, 7 in the inner bearing ring 2 and in raceways 4, 6 in the outer bearing ring 3. The shoulders of the outer bearing ring 3, which define raceways 4 and 6 thereof, are in each case realized so as to be taller on the one side of the associated ball row 10a or 10b than on the other side. The shoulders of the inner bearing ring 2, which define the raceways 5 and 7, are also in each case realized so as to be taller on one side of the associated ball row 10a or 10b than on the other side. In the case of the multiple-row ball bearing arrangement 1, as is shown in FIG. 1, the shoulders defining the raceways 4, 5, 6, 7 are realized over and above this in the manner of a tandem angular-contact ball bearing which allows axial loads to be transmitted only in one direction at this bearing point along the longitudinal axis AX from the inner bearing ring 2 to the outer bearing ring 3. Consequently, the multiple-row ball bearing arrangement 1 is single-thrust.

The bearing rings 2, 3 can be defined in the axial direction AX by two end faces 8 and 9. The bearing rings 2 and 3 have the identical axial extension in the case of the exemplary embodiment of the multiple-row ball bearing arrangement shown in FIG. 1. The multiple-row ball bearing arrangement 1 has a graduated circle surface 22a which is in the shape of a cylindrical surface which includes a graduated circle 21a of the first ball row 10a of the ball bearing arrangement 1. Over and above this, the multiple-row ball bearing arrangement 1 also has a graduated circle surface 22b, which is associated with the second ball row 10b, also is in the shape of a cylindrical surface and includes a graduated circle 21b of the second ball row 10b of the multiple-row ball bearing arrangement 1. The longitudinal axis AX also forms the axis of the graduated circle surfaces 22a, 22b. In the case of FIG. 1, the diameter of the graduated circle surface 22a associated with the first ball row 10a is smaller than the diameter of the graduated circle surface 22b associated with the second ball row 10b. In addition, a radius 13a of a ball 11a of the first ball row 10a is smaller than a radius 13b of a ball 11b of the second ball row 10b.

The sectional plane shown in FIG. 1 corresponds to a radial plane which includes the longitudinal axis AX and extends through a mid-point 12a of the ball 11a of the first ball row 10a and at the same time through a mid-point 12b of the ball 11b of the second ball row 10b. Consequently, for the purposes of better representation, two balls 11a, 11b, which are movable in a rolling manner between the associated raceways in the direction of the circumference of the bearing rings 2, 3, are arranged in FIG. 1 in such a manner that the mid-points 12a, 12b of the two balls 11a, 11b are located in the same radial plane through the longitudinal axis AX.

A first and a second cage 14a, 14b are provided to guide the balls 11a, 11b inside the multiple-row ball bearing arrangement 1 and to ensure uniform clearances between the balls 11a of the first ball row 10a and the balls 11b of the second ball row 10b in the circumferential direction of the ball bearing arrangement 1. The first cage 14a serves to guide the balls 11a of the first ball row 10a, while the second cage 14b is provided to guide the balls 11b of the second ball row 10b. The inner bearing ring 2, the outer bearing ring 3, the first cage 14a and the second cage 14b are arranged substantially coaxially with respect to each other. Both cages 14a, 14b are able to be produced in an advantageous manner using injection molding methods, for example from a glass-fiber reinforced polyamide, as a result of which cages which weigh little but are stable under load are obtained.

The first cage 14a has a first cage side ring 15a and a second cage side ring 16a. The two cage side rings 15a, 16a of the first cage 14a are preferably realized in the shape of an annulus, in a preferred manner arranged concentrically with respect to each other about the longitudinal axis AX and connected together by means of multiple webs 17a (not visible in FIG. 1). The webs 17a can be distributed in an even manner along the circumferential direction of the first cage 14a. In each case two adjacent webs 17a, together with a circumferential section 19a of the first cage side ring 15a lying between the two webs 17a and a circumferential section 20a of the second cage side ring 16a also lying between the two webs 17a, form a number of pockets 18a which in each case can accommodate a ball 11a of the first ball row 10a.

In the same way, the second cage 14b has a first cage side ring 15b and a second cage side ring 16b. The two cage side rings 15b, 16b of the second cage 14b are also preferably in the shape of an annulus, are preferably arranged concentrically with respect to each other about the longitudinal axis AX and are connected together by means of multiple webs 17b (also not visible in FIG. 1). The webs 17b of the second cage 14b can also be distributed evenly along the circumferential direction of the multiple-row ball bearing arrangement 1. Similarly, as previously described for the first cage 14a, two adjacent webs 17b, together with a circumferential section 19b of the first cage side ring 15b and a circumferential section 20b of the second cage side ring 16b, form pockets 18b which in each case accommodate a ball 11b of the second ball row 10b.

As can be seen in addition from FIG. 1, the two cages 14a and 14b of the multiple-row ball bearing arrangement 1 are arranged inside the installation space available around the balls 11a, 11b between the two bearing rings 2, 3 in such a manner that the first cage side ring 15a of the first cage 14a and the second cage side ring 16b of the second cage 14b are arranged adjacent each other and so as to overlap along the longitudinal axis AX of the multiple-row ball bearing arrangement 1. In the case of the exemplary embodiment shown, the first cage side ring 15a of the first cage 14a has an inner diameter which is larger than the outer diameter of the second cage side ring 16b of the second cage 14b. In this way, the first cage side ring 15a of the first cage 14a is able to encompass the second cage side ring 16b of the second cage 14b along the circumferential direction thereof.

In a radial direction of the multiple-row ball bearing arrangement 1, as is represented in FIG. 1, the first cage side ring 15a of the first cage 14a and the second cage side ring 16b of the second cage 14b are located side by side in a space between the two ball rows 10a and 10b, the first cage side ring 15a of the first cage 14a and the second cage side ring 16b of the second cage 14b not touching each other, but rather between the two a gap remaining which is sufficient to ensure that the cage side rings 15a and 16b rotate during the operation of the multiple-row ball bearing arrangement 1 without becoming joined together or rubbing against each other. This can ensure that even if, for example as a result of a certain load situation of the multiple-row ball bearing arrangement 1, which is realized in this exemplary embodiment as a two-row angular-contact ball bearing, the first ball row 10a rotates at a speed which is different from a rotating speed of the second ball row 10b, the cages 14a, 14b are not stressed by additional forces brought about by this speed difference. Consequently, it is possible to construct the cages 14a, 14b with a long service life in a comparatively light and space saving manner and to produce them using a small amount of materials. Because the webs 17a, 17b can also be realized in a lighter and more space-saving manner as a result of the omitted additional stresses, it is possible to increase the number of balls 11a, 11b per ball row 10a, 10b, which, once again, can have a favorable effect on the bearing strength of the multiple-row ball bearing arrangement 1.

Over and above this, the circumferential section 19a of the first cage side ring 15a and the circumferential section 20a of the second cage side ring 16a of the first cage 14a, when viewed in a plane which extends through the mid-point 12a of a ball 11a of the first ball row 10a accommodated in the pocket 18a and at the same time includes the longitudinal axis AX, are preferably arranged completely on different sides of the graduated circle surface 22a of the first ball row 10a associated with the first cage 14a. This means that the two circumferential sections 19a and 20a do not touch the graduated circle surface 22a. In FIG. 1, the circumferential section 20a of the second cage side ring 16a of the first cage 14a is consequently arranged in a preferred manner completely radially inside the graduated circle surface 22a, while the circumferential section 19a of the first cage side ring 15a is arranged completely radially outside the graduated circle surface 22a. In the case of this exemplary embodiment over and above this, the two circumferential sections 19a and 20a, in the sectional plane shown, are in each case spaced radially from the graduated circle surface 22a by an amount which is somewhat greater than the cross-sectional dimension of the respective circumferential section 19a, 20a in said sectional plane in the radial direction of the ball bearing arrangement.

The circumferential section 19b of the first cage side ring 15b and the circumferential section 20b of the second cage side ring 16b of the second cage 14b, when viewed in a plane which extends through the mid-point 12b of a ball 11b accommodated in the pocket 18b and includes the longitudinal axis AX, are also preferably arranged completely on different sides of a graduated circle surface 22b of the ball row 10b associated with the second cage 14b and do not touch the graduated circle surface 22b. As shown once again in FIG. 1, in the sectional plane shown, the circumferential section 19b preferably lies completely radially outside the graduated circle surface 22b of the second ball row 10b, while the circumferential section 20b is arranged completely radially inside the graduated circle surface 22b of the second ball row 10b. Over and above this, in the sectional plane shown, the two circumferential sections 19b and 20b are also radially spaced from the graduated circle surface 22b by an amount which is somewhat greater than the dimension of the respective circumferential section 19b, 20b in this sectional plane in the radial direction of the multiple-row ball bearing arrangement 1.

As is also shown in FIG. 1, the circumferential section 19a of the first cage side ring 15a and the circumferential section 20a of the second cage side ring 16a of the first cage 14a, once again when viewed, for example, in the already described radial plane through the mid-point 12a of the ball 11a, are preferably arranged substantially opposite each other with reference to the mid-point 12a. The circumferential section 19b of the first cage side ring 15b and the circumferential section 20b of the second cage side ring 16b of the second cage 14b, when viewed in the afore-described plane which extends through the mid-point 12b of the ball 11b and includes the longitudinal axis AX, are also preferably arranged substantially opposite each other with reference to the mid-point 12b.

As already stated, the first cage side ring 15a of the first cage 14a and the second cage side ring 16b of the second cage 14b overlap along the axial direction AX of the multiple-row ball bearing arrangement 1. In the case of the exemplary embodiment as is shown in a sectional plane in FIG. 1, in detail it is the circumferential section 19a of the first cage side ring 15a of the first cage 14a and the circumferential section 20b of the second cage side ring 16b of the second cage 14b which overlap. The circumferential section 19a of the first cage side ring 15a of the first cage 14a and the circumferential section 20b of the second cage side ring 16b of the second cage 14b, when viewed in this sectional plane, are both in a preferred manner completely radially outside the graduated circle surface 22a of the first ball row 10a and at the same time in a preferred manner are also both arranged completely radially inside the graduated circle surface 22b of the second ball row 10b. Consequently, in the case of this exemplary embodiment. As claimed in FIG. 1, the circumferential section 19a of the first cage side ring 15a of the first cage 14a and the circumferential section 20b of the second cage side ring 16b of the second cage 14b are arranged between the graduated circle surfaces 22a and 22b of the first and the second ball rows 10a, 10b. This space-saving method of construction can be made possible by an arrangement of the circumferential sections 19a and 20b where the clearance to the graduated circle surfaces 22a or 22b is selected to be sufficiently large. As can be seen from FIG. 1, the clearance between the circumferential section 19a of the first cage side ring 15a of the first cage 14a and the graduated circle surface 22a of the first ball row 10a can be selected in such a manner that also the circumferential section 20b of the second cage side ring 16b of the second cage 14b is able to be accommodated between the circumferential section 19a and the graduated circle surface 22a with sufficient air to the adjacent balls and bearing rings. In the same way, the clearance between the circumferential section 20b of the second cage side ring 16b of the second cage 14b and the graduated circle surface 22b of the second ball row 10b can be selected so as to be sufficiently large in order to be able to arrange also the circumferential section 19a of the first cage side ring 15a of the first cage 14a with play with respect to the adjoining components between the graduated circle surface 22b and the circumferential section 20b in a radial direction of the multiple-row ball bearing arrangement 1.

Over and above this, the first cage 14a and the second cage 14b are preferably realized in such a manner that the first cage side ring 15b of the second cage 14b and the second cage side ring 16a of the first cage 14a do not protrude beyond the axial end faces 8, 9 which define the multiple-row ball bearing arrangement 1 along the longitudinal axis AX as claimed in the exemplary embodiment shown in FIG. 1.

The design of the bearing rings 2, 3 can be affected in the manner shown schematically in FIG. 1. However, the bearing rings 2, 3, in particular the contour of the raceways 4, 5, 6, 7 and the transitions between the raceways 4 and 6 of the outer bearing ring 3 and the transitions between the raceways 5 and 7 of the inner bearing ring 2, are also able to be shaped differently to as shown in FIG. 1 and the multiple-row ball bearing arrangement 1 can be provided at the same time with cages 14a and 14b which are realized and arranged as described above with reference to FIG. 1 and below with reference to FIGS. 2 to 9.

The design of the two cages 14a, 14b of the multiple-row ball bearing arrangement 1 is described below in more detail. In the following, the development of the first cage 14a of the multiple-row ball bearing arrangement 1 as claimed in the exemplary embodiment shown in the afore-discussed FIG. 1 is explained further with reference to FIGS. 2, 3, 4 and 5 of the drawing. The development of the second cage 14b of the multiple-row ball bearing arrangement 1 as claimed in the exemplary embodiment of FIG. 1 will then be described with reference to FIGS. 6, 7, 8 and 9. When looking at FIGS. 2 to 9, it must be noted that the first and second cages 14a, 14b of the multiple-row ball bearing arrangement 1 are shown there in a view that is mirror-inverted with respect to the representation of FIG. 1. The views of the cages 14a, 14b in FIGS. 2 to 9 therefore correspond to a view of said cages 14a, 14b in FIG. 1 from behind, in other words the views are mirrored on an axis which is vertical in FIG. 1 and extends along the radial direction of the ball bearing arrangement 1.

Figure 2:
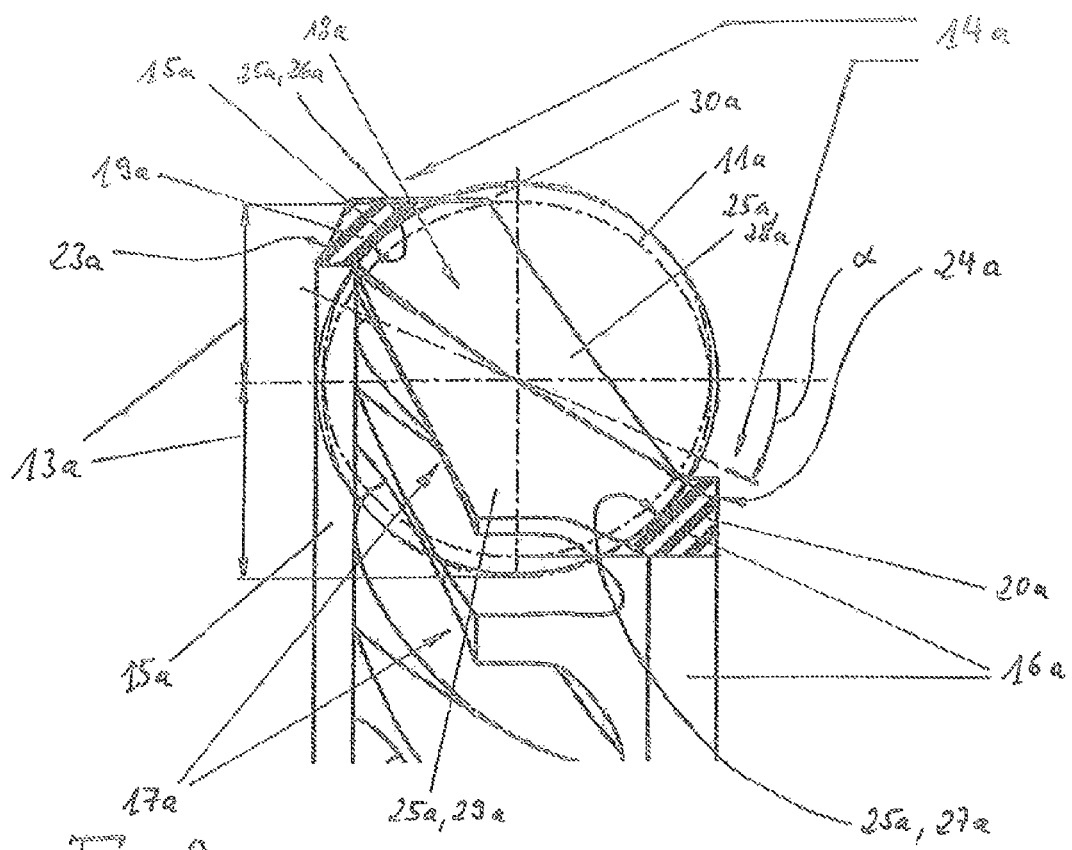
FIG. 2 shows a representation of a first cage of the multiple-row ball bearing arrangement as claimed in FIG. 1 in a radially guided longitudinal section through the mid-point of a ball accommodated in a pocket of the cage.

FIG. 2 shows a representation of a first cage 14a of the multiple-row ball bearing arrangement 1 as claimed in FIG. 1 in a radially guided longitudinal section through the mid-point of a ball accommodated in a pocket of the cage 14a. In the case of this exemplary embodiment, the first cage side ring 15a of the first cage 14a has a larger inner and outer diameter than the second cage side ring 16a of the first cage 14a.

In the sectional plane shown in FIG. 2, the circumferential section 19a of the first cage side ring 15a and the circumferential section 20a of the second cage side ring 16a of the first cage 14a are arranged outside an angular region which is symmetrical to the track of the graduated circle surface in this plane and is measured from the mid-point of the ball 11a. Half an angular aperture α of said angular region downward with reference to the track of the graduated circle surface is indicated in FIG. 2 by means of a broken line and in a preferred manner in the case of the exemplary embodiment shown is at least approximately between 15 and 25 degrees.

The second cage side ring 16a of the first cage 14a has an axial defining surface 24a, which points in the axial direction away from the center of the ball bearing arrangement and can be realized in a substantially even manner and substantially at a right angle with respect to the longitudinal axis AX. In this way, the installation space available for the first cage 14a between the bearing rings 2, 3 can be used in a favorable manner for accommodating a sufficiently sturdy first cage side ring 16a and at the same time, with a small space requirement, the cage is prevented from projecting beyond the end face 8 of the multiple-row ball bearing arrangement 1.

An axial defining surface 23a, which points in the direction of the second ball row 10b adjacent the first ball row 10a, is provided on the first cage side ring 15a of the first cage 14a. As FIG. 2 shows, the axial defining surface 23a, when viewed in a section along a radial direction of the ball bearing arrangement, preferably has a circular arc profile. The entire axial defining surface 23a is generated in this case, however, by a rotation of said circular arc profile about the longitudinal axis AX. Consequently, the axial defining surface 23a of the cage 14a, which is realized as a three-dimensional body, provides part of a toroidal surface.

In the case of the first cage 14a, shown in FIG. 2, of the multiple-row ball bearing arrangement 1 of FIG. 1, the axial defining surface 23a of the first cage side ring 15a of the first cage 14a preferably corresponds substantially to a toroidal surface, which is arranged coaxially with respect to the cage side ring 15a and is generated by a ball 11b of the second ball row 10b as the ball 11b rolls between the raceways 6 and 7 as an envelope surface of its spherical surfaces enlarged by play in all its possible positions along the associated raceways 6, 7. In other words, said toroidal surface, can be generated as an envelope surface of a ball which is moved about the longitudinal axis AX on a circular path with the diameter of the graduated circle 22b of the second ball row 10b having a radius which is greater, preferably by a small amount of play, than the radius 13b of the ball 11b.

Cylindrical surfaces which are coaxial with respect to the longitudinal axis AX can form radial defining surfaces of the first cage side ring 15a and of the second cage side ring 16a of the first cage 14a.

Figure 3:
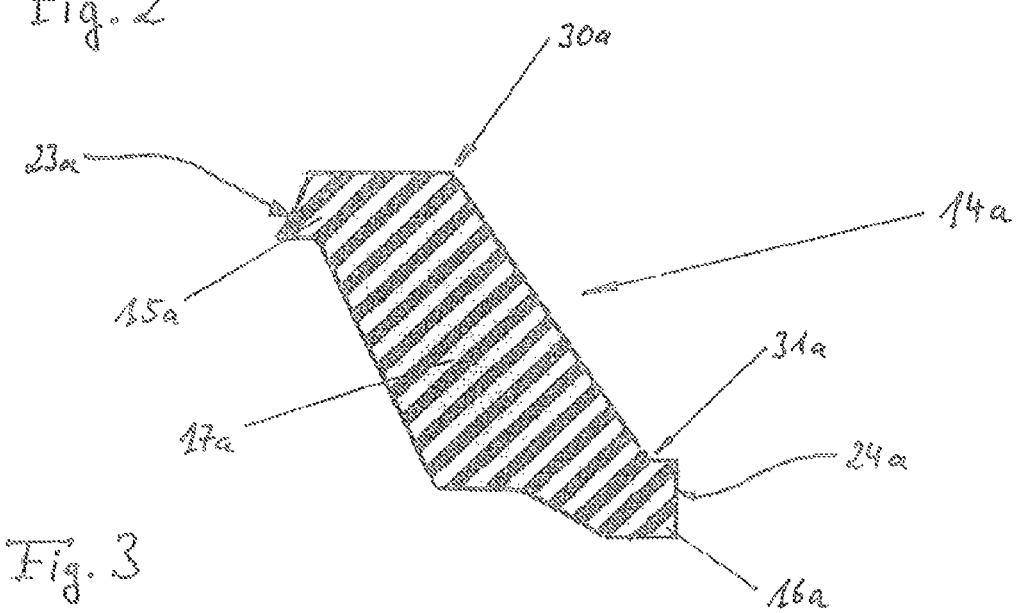
FIG. 3 shows a representation of the first cage as claimed in FIG. 2 in a radially guided longitudinal section through the center of a web between two pockets of the cage.

FIG. 3 shows a representation of the first cage 14a as claimed in FIG. 2 in a radially guided longitudinal section through the center of a web 17a between two pockets 18a of the first cage 14a.

Figure 3A:
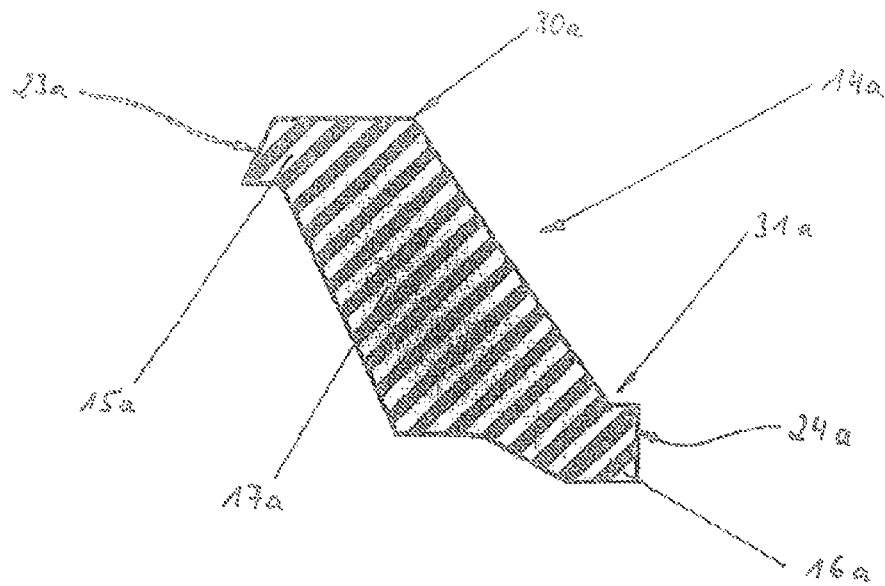
FIG. 3a shows a representation of a first cage as claimed in an exemplary embodiment with an alternative development of one of its axial defining surfaces, in a radially guided longitudinal section through the center of a web between two pockets of the cage.

FIG. 3a shows a sectional representation of a first cage 14a through the center of web 17a between two pockets 18a as claimed in an exemplary embodiment where an axial defining surface 23a of a first cage side ring 15a has an alternative development and is realized in a preferred manner as a conical surface which is coaxial with respect to the longitudinal axis AX.

Figure 3B:
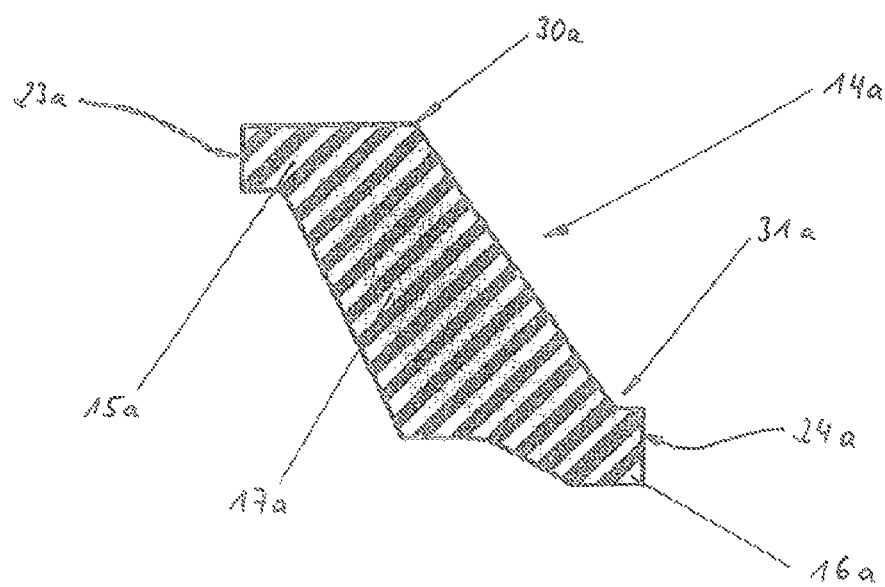
FIG. 3b shows a representation of a first cage as claimed in a further exemplary embodiment with another alternative development of one of its axial defining surfaces, in a radially guided longitudinal section through the center of a web between two pockets of the cage.

FIG. 3b shows a sectional representation of a first cage 14a through the center of a web 17a between two pockets 18a as claimed in a further exemplary embodiment where an axial defining surface 23a of a first cage side ring 15a has another alternative development. In this development, the axial defining surface 23a is realized as a flat surface which in a preferred manner is at a right angle with respect to the longitudinal axis AX.

Figure 4:
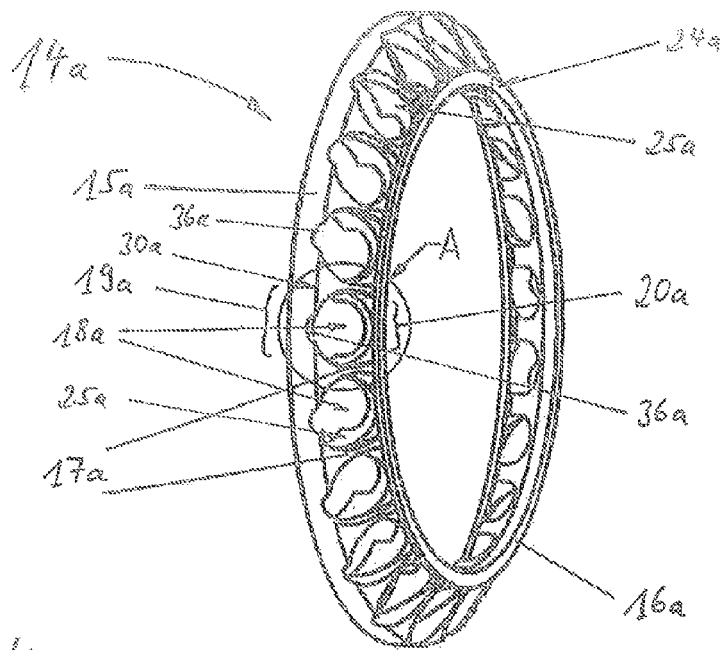
FIG. 4 shows a perspective view of the first cage as claimed in FIG. 2, when seen in a direction toward the outer lateral surface of the first cage.

FIG. 4 shows a perspective view of the first cage 14a as claimed in FIG. 2, the first cage 14a being viewed from the direction of the outer lateral surface of the first cage 14a. The first cage side ring 15a of the first cage 14a and the second cage side ring 16a of the first cage 14a are connected together by webs 17a which are preferably spaced evenly along the circumference of the cage.

Figure 5:
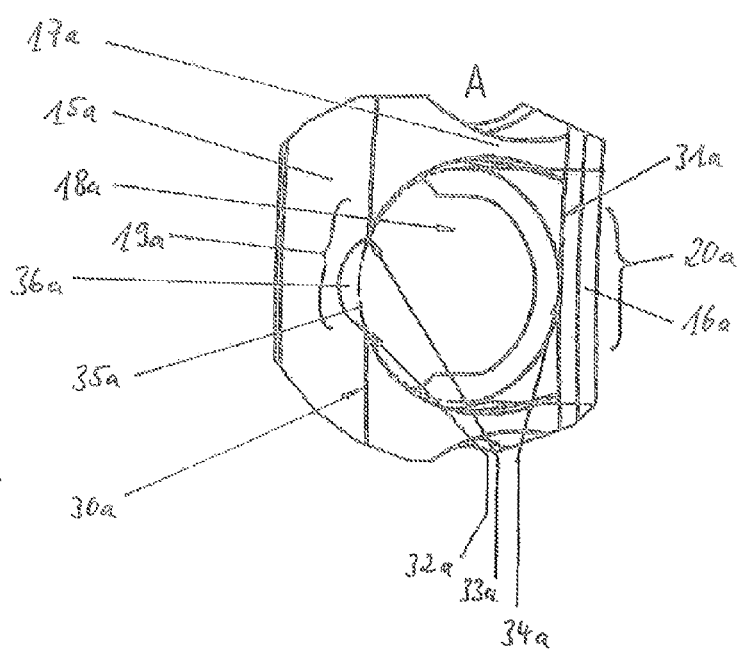
FIG. 5 shows a view of a detail A from FIG. 4.

The view of the detail A in the perspective view of FIG. 4 which is shown in FIG. 5 shows a pocket 18a, which is formed by two adjacent webs 17a, one circumferential section 19a of the first cage side ring 15a and one circumferential section 20a of the second cage side ring 16a of the first cage 14a. In a preferred manner the pocket 18a is closed in such a way that it is able to encompass a ball 11a completely in the circumferential direction thereof in a plane which extends through the mid-point 12a of the ball 11a. This can also be seen from the sectional representations in FIGS. 2 and 3.

In addition, a pocket 18a, which is provided for accommodating a ball 11a, has a defining surface 25a which faces the ball 11a and is preferably formed from sections 26a, 27a of a spherical surface and sections 28a, 29a, of a cylindrical surface which connect thereto, as shown in FIG. 2. In detail, this means that a radially outside part of the defining surface 25a of the pocket 18a can be formed from a section of a spherical surface 26a, which is on the left in FIG. 2 and is adjacent the first cage side ring 15a of the first cage 14a, and a section of a cylindrical surface 28a which connects to said section of a spherical surface 26a in the axial direction and is further to the right in FIG. 2. In the case of the first cage 14a of the multiple-row ball bearing arrangement 1 as claimed in FIG. 2, the diameter of the spherical surface, which generates the section 26a, preferably corresponds to the diameter of the cylindrical surface, which generates the section 28a. In the same way, a radially inside part of the defining surface 25a of the pocket 18a can be formed from a section of a spherical surface 27a, which is on the right in FIG. 2 and is adjacent the second cage side ring 16a of the first cage 14a, and a section of a cylindrical surface 29a which connects to said section of a spherical surface 27a in the axial direction and is further to the left in FIG. 2. In the case of the first cage 14a of the exemplary embodiment of the multiple-row ball bearing arrangement 1 shown in FIG. 1, the diameter of the spherical surface, which generates the section 27a, once again corresponds to the diameter of the cylindrical surface, which generates the section 29a. Through this structure, the pocket 18a is able to be produced by means of an injection mold which has mold cores which are exclusively movable in the axial direction AX and are in the form of pins which fill out an interior region of the pocket 18a. Radially movable cores can consequently be dispensed with, which simplifies the production of the first cage 14a and makes it cheaper.

As shown again in FIG. 5, a three-point snap-type device for holding the ball 11a in the pocket 18a is preferably provided in the region of the pocket 18a, said three-point snap-type device being formed by two points 32a, 33a of the first cage side ring 15a and by one point 34a of the second cage side ring 16a. In the case of the exemplary embodiment shown, the two points 32a and 33a of the first cage side ring 15a are different from each other and lie on an edge 30a, bordering the pocket 18a, of an outer circumferential surface of the first cage side ring 15a, while the one point 34a of the second cage side ring 16a lies on an edge 31a, bordering the pocket 18a, of an outer circumferential surface of the second cage side ring 16a of the first cage 14a. The points 32a, 33a and 34a are preferably arranged on a circle 35a which is indicated by a dot-dash line in FIG. 5. In a preferred manner, the circle 35a has a diameter which is smaller than the diameter of the ball 11a accommodated in the pocket 18a.

The two points 32a and 33a on the edge 30a, bordering the pocket, of the outer circumferential surface of the first cage side ring 15a can form two corners of a recess 36a in the first cage side ring 15a of the first cage 14a, as shown in FIG. 5. The recess 36a in the outer circumferential surface of the first cage side ring 15a can have a circular segment-like form. By selecting the diameter of the circle 35a as described above, the ball 11a can be inserted or snapped into the interior region of the pocket 18a by the corners of the recess 36a yielding in a resilient manner.

Figure 6:
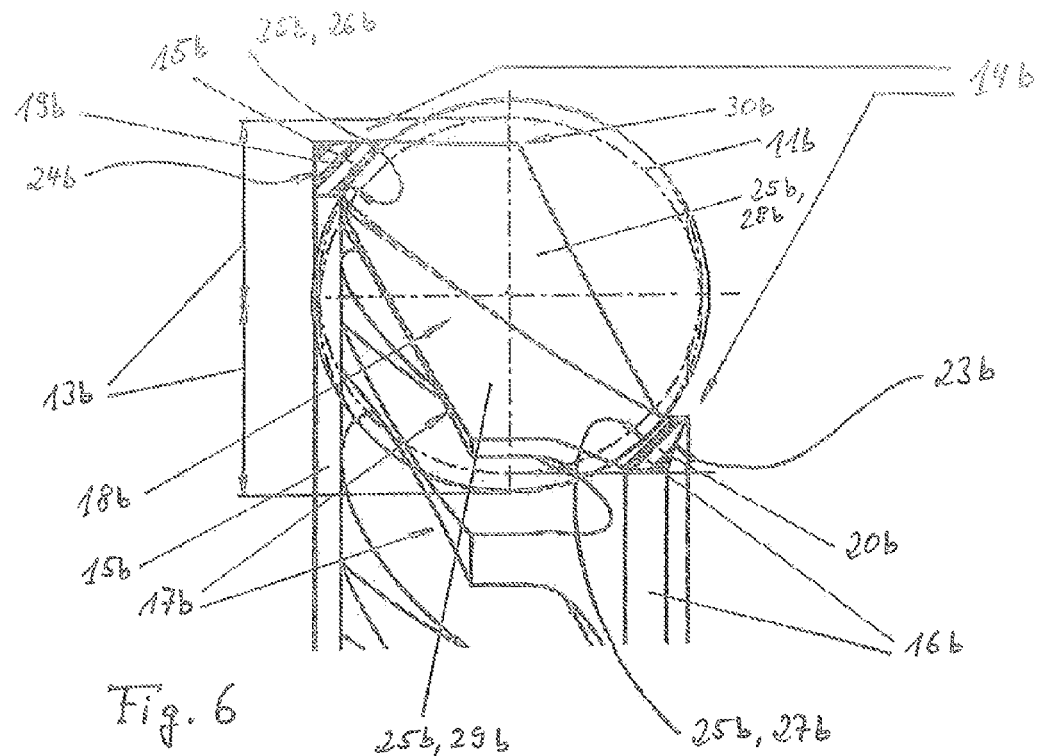
FIG. 6 shows a representation of a second cage of the multiple-row ball bearing arrangement as claimed in FIG. 1 in a radially guided longitudinal section through the mid-point of a ball accommodated in a pocket of the cage.

FIG. 6 shows a representation of a second cage 14b of the multiple-row ball bearing arrangement 1 as claimed in the exemplary embodiment of FIG. 1 in a radially guided longitudinal section through the mid-point of a ball accommodated in a pocket of the cage 14b. The first cage side ring 15b of the second cage 14b has a larger inner and outer diameter than the second cage side ring 16b of the second cage 14b.

The first cage side ring 15b of the second cage 14b preferably has an axial defining surface 24b which points in the axial direction AX away from the center of the ball bearing arrangement and is realized so as to be substantially even and substantially at a right angle with respect to the longitudinal axis AX. As already explained with reference to the first cage 14a, the available space is able to be utilized in a particularly good manner by a structure of this type.

An axial defining surface 23b is also provided in a preferred manner on the second cage side ring 16b of the second cage 14b, said axial defining surface, when viewed in a radial section through the multiple-row ball bearing arrangement 1, also being provided with a circular arc profile. This means that the axial defining surface 23b of the second cage side ring 16b of the second cage 14b points in the direction of the first ball row 10a which is adjacent the second ball row 10b. Once again, the entire axial defining surface 23b can be generated by a rotation of said circular arc profile about the longitudinal axis AX. Consequently, in the case of this exemplary embodiment, the axial defining surface 23b of the cage 14b, which is realized as a three-dimensional body, also provides part of a toroidal surface, said toroidal surface being different from the toroidal surface mentioned with reference to the axial defining surface 23a of the first cage side ring 15a of the first cage 14a.

In the case of the second cage 14b, now shown in FIG. 6, of the multiple-row ball bearing arrangement 1 as claimed in FIG. 1, the axial defining surface 23b of the second cage side ring 16b preferably corresponds substantially to a toroidal surface which is arranged coaxially with respect to the cage side ring 16b and is generated by a ball 11a of the first ball row 10a as the ball 11a rolls between the raceways 4 and 5 as an envelope surface of its spherical surfaces enlarged by play in all of its possible positions along the associated raceways 4, 5. In other words, said toroidal surface can be generated as an envelope surface of a ball which is moved about the longitudinal axis AX on a circular path with the diameter of the graduated circle 22a of the first ball row 10a having a radius which is greater, preferably by a small amount of play, than the radius 13a of the ball 11a.

in the case of another exemplary embodiment, the axial defining surface 23b of the second cage side ring 16b of the second cage 14b can also be realized as a conical surface or as a flat surface which is at a right angle to the longitudinal axis AX as described above with reference to FIGS. 3a and 3b.

Cylindrical surfaces, which are coaxial with respect to the longitudinal axis AX, can form radial defining surfaces of the first cage side ring 15b and of the second cage side ring 16b of the second cage 14b.

Figure 7:
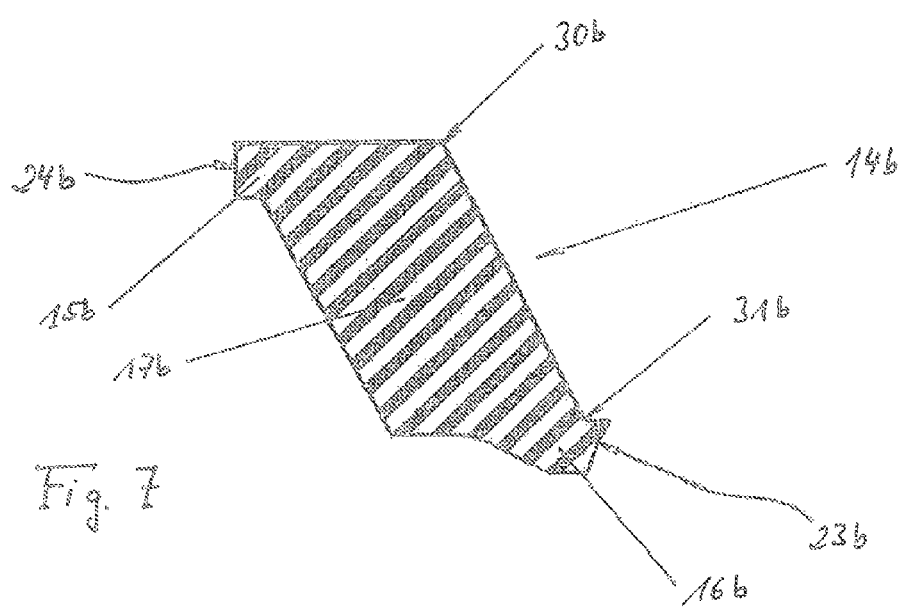
FIG. 7 shows a representation of the second cage as claimed in FIG. 6 in a radially guided longitudinal section through the center of a web between two pockets of the cage.

FIG. 7 shows a representation of the second cage as claimed in FIG. 6 in a radially guided longitudinal section through the center of a web 17b between two pockets 18b of the second cage 14b.

Through the shaping of the axial defining surface 23a of the first cage side ring 15a of the first cage 14a explained with reference to FIG. 2 and through the additional shaping of the axial defining surface 23b of the second cage side ring 16b of the second cage 14b described above with reference to FIG. 6, a large overlap of the first cage side ring 15a of the first cage 14a and of the second cage side ring 16b of the second cage 14b can be achieved because in the region of the cage side rings 15a and 16b through suitably selected cross-sections of said cage side rings 15a, 16b, it is possible to create space for the ball row 10b or 10a adjoining in each case, as once again the sectional view of the exemplary embodiment of the assembled multiple-row ball bearing arrangement 1 in FIG. 1 makes clear. Frictional contact between the first cage side ring 15a of the first cage 14a and the balls 11b of the second ball row 10b and frictional contact between the second cage side ring 16b of the second cage 14b and the balls 11a of the first ball row 10a can be avoided in this manner, which has a favorable effect on the service life of the cages 14a, 14b and also a favorable effect with regard to a weight-saving design of the cages 14a, 14b. FIG. 1 also shows that the clearance between rows 37 of the first ball row 10a and the second ball row 10b, which is measured in the direction of the longitudinal axis AX between the mid-point 12a of a ball 11a of the first ball row 10a and the mid-point 12b of a ball 11b of the second ball row 10b, can be smaller than the sum of the radii 13a, 13b of said two balls 11a, 11b.

Figure 8:
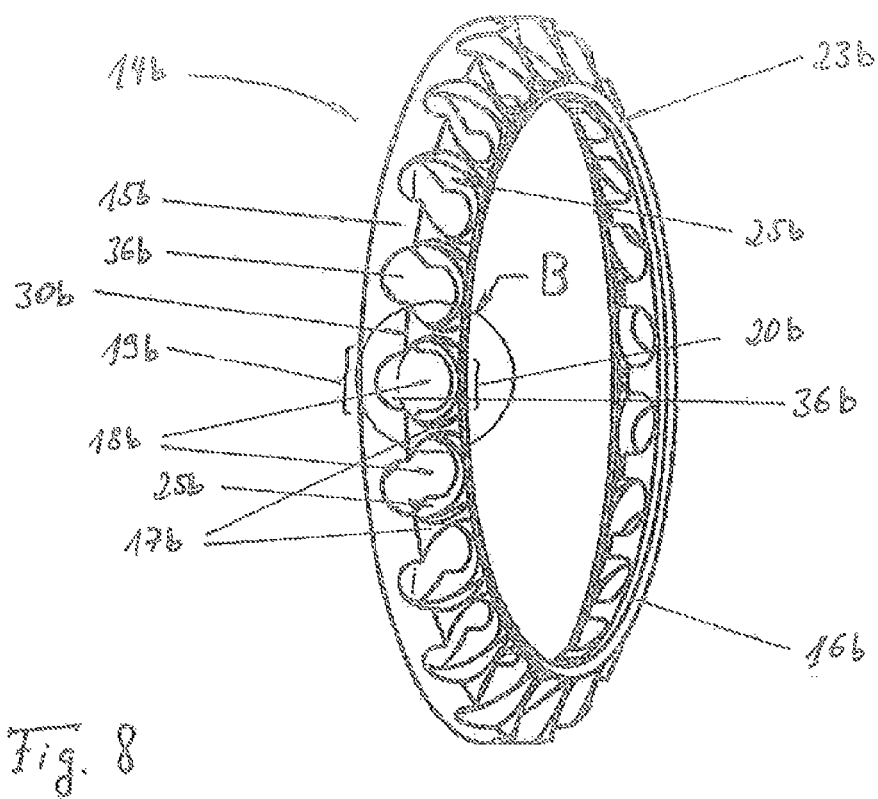
FIG. 8 shows a perspective view of the second cage as claimed in FIG. 6, when viewed in a direction toward the outer lateral surface of the second cage.

FIG. 8 shows a perspective view of the second cage 14b as claimed in FIG. 6, the second cage 14b being viewed from the direction of the outer lateral surface of the second cage 14b. The first cage side ring 15b of the second cage 14b and the second cage side ring 16b of the second cage 14b are connected together by webs 17b which are preferably spaced evenly along the circumference of the cage 14b.

Figure 9:
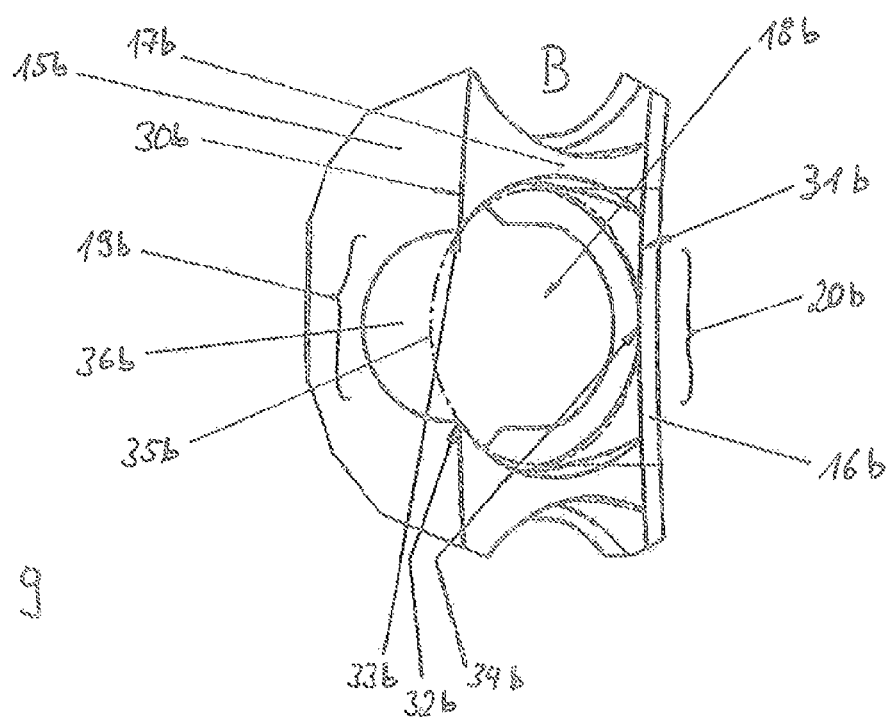
FIG. 9 shows a view of a detail B from FIG. 8.

The view of detail B in the perspective view of FIG. 8 shown in FIG. 9 shows a pocket 18b, which is formed by two adjacent webs 17b, one circumferential section 19b of the first cage side ring 15b and one circumferential section 20b of the second cage side ring 16b of the second cage 14h. The pocket 18b is preferably closed in such a manner that it is able to encompass a ball 11b completely in the circumferential direction thereof in a plane which extends through the mid-point 12b of the ball 11b. This can also be seen from the sectional representations in FIGS. 6 and 7.

In addition, a pocket 18b, which is provided for accommodating a ball 11b, has a defining surface 25b which faces the ball 11b and is preferably formed from sections 26b, 27b of a spherical surface and sections 28b, 29b of a cylindrical surface connecting thereto, as shown in FIG. 6. In detail, a radially outside part of the defining surface 25b of the pocket 18b can be formed from a section of a spherical surface 26b, which is on the left in FIG. 6 and is adjacent the first cage side ring 15b of the second cage 14b, and a section of a cylindrical surface 28b, which connects to said section of a spherical surface 26b in the axial direction and is further to the right in FIG. 6. In the case of the second cage 14b of the multiple-row ball bearing arrangement 1 as claimed in FIG. 6, the diameter of the spherical surface, which generates the section 26b, preferably corresponds to the diameter of the cylindrical surface, which generates the section 28b. In the same way, a radially inside part of the defining surface 25b of the pocket 18b can be formed from a section of a spherical surface 27b, which is on the right in FIG. 6 and is adjacent the second cage side ring 16b of the second cage 14b, and a section of a cylindrical surface 29b, which connects to said section of a spherical surface 27b in the axial direction and is further to the left in FIG. 6. In the case of the second cage 14b of the multiple-row ball bearing arrangement 1 of FIG. 6, once again the diameter of the spherical surface, which generates the section 27b, corresponds to the diameter of the cylindrical surface, which generates the section 29b. Through this structure it is possible to produce the pocket 18b by means of an injection mold which has mold cores which are movable exclusively in the axial direction AX and are in the form of pins which fill out the interior region of the pocket 18b. Consequently, radially movable cores can be dispensed with, which simplifies the production of the second cage 14b and makes it cheaper.

As now shown again in FIG. 9, a three-point snap-in device for holding the ball 11b in the pocket 18b is also preferably provided in the region of the pocket 18b of the second cage 14b, said three-point snap-in device being formed by two points 32b, 33b of the first cage side ring 15b and by one point 34b of the second cage side ring 16b. In the case of the exemplary embodiment shown, the two points 32b and 33b of the first cage side ring 15b are different from each other and lie on an edge 30b, bordering the pocket 18b, of an outer circumferential surface of the first cage side ring 15b, while the one point 34b of the second cage side ring 16b lies on an edge 31b, bordering the pocket 18b, of an outer circumferential surface of the second cage side ring 16b of the second cage 14b. The points 32b, 33b and 34b are preferably arranged on a circle 35b which is indicated in FIG. 9 by a dot-dash line. The circle 35b preferably has a diameter which is smaller than the diameter of the ball 11b accommodated in the pocket 18b.

The two points 32b and 33b of the edge 30b, bordering the pocket, of the outer circumferential surface of the first cage side ring 15b can form two corners of a recess 36h in the first cage side ring 15b of the second cage 14b, as shown in FIG. 9. The recess 36b in the outer circumferential surface of the first cage side ring 15b can have a circular segment-like shape. By selecting the diameter of the circle 35b as described above, the ball 11b can be inserted into the interior region of the pocket 18b by the corners of the recess 36b yielding in a slight manner.

Figure 10:
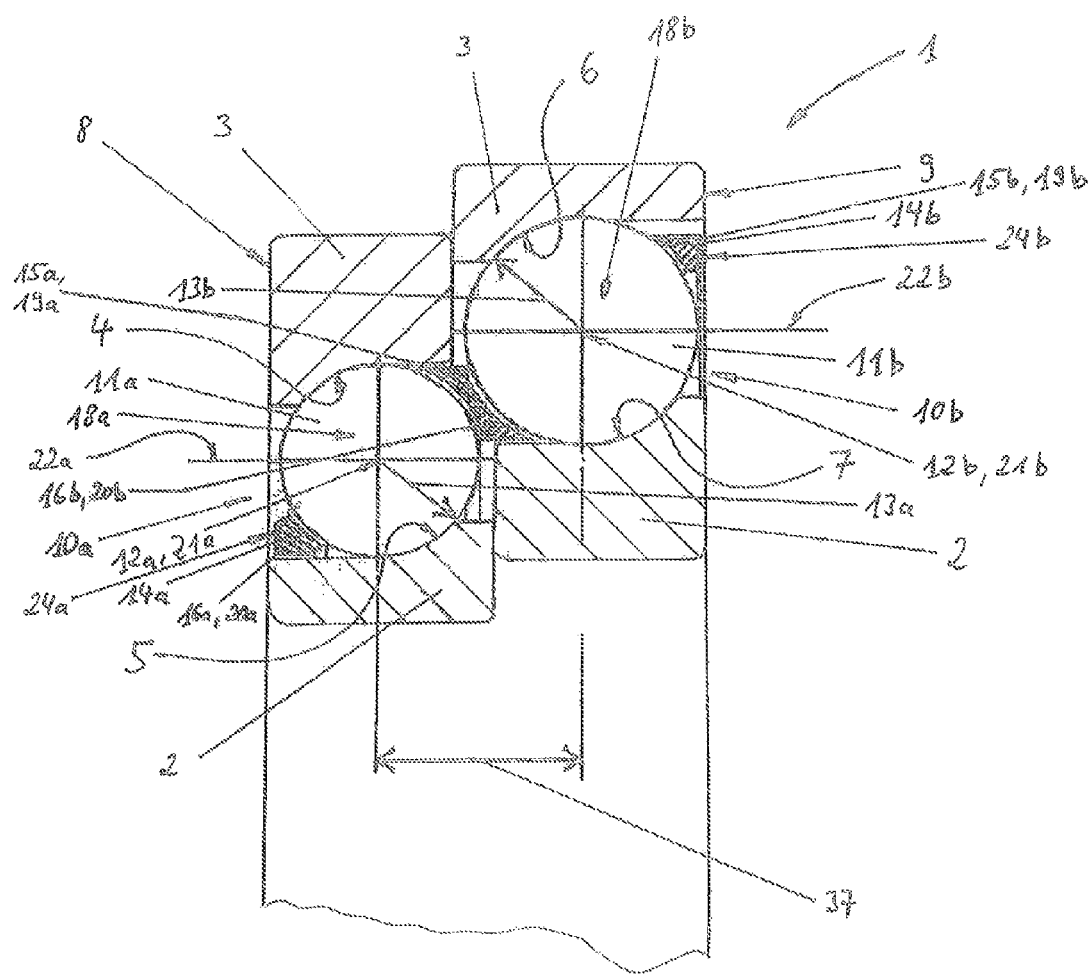
FIG. 10 shows a representation of a multiple-row ball bearing arrangement in a longitudinal section as claimed in a further exemplary embodiment of the invention.

FIG. 10 shows a further exemplary embodiment of the multiple-row ball bearing arrangement which differs from the exemplary embodiment described with reference to FIGS. 1 to 9 in that the inner bearing ring 2 and the outer bearing ring 3 are not realized in each case as a single component, but in each case are divided and consequently consist of two rings, which are arranged one behind the other in the longitudinal direction of the bearing and are provided, in their turn, with raceways for the balls. In FIG. 10, the two parts of the inner bearing ring are provided in each case with the reference 2 and the two parts of the outer bearing ring are provided in each case with the reference 3.

Although the invention has been described above by way of preferred exemplary embodiments, it is not restricted to them, but is able to be modified in diverse ways without departing from the object of the present invention.

In particular, the invention is not restricted to two-row angular-contact ball bearings. Rather, it is conceivable, for example, to provide angular-contact ball bearings with an arbitrary number of ball rows, which can have both identical and different ball graduated circle diameters and identical and different ball diameters, with cages in the afore-described manner for guiding the balls.

Over and above this, it is naturally also conceivable for the individual ball rows with their associated raceways in the bearing rings to be provided so as not to be single-thrust in a tandem arrangement, but so as to be double-thrust in an X-arrangement or an O-arrangement.

In addition, it is naturally possible to provide not only angular-contact ball bearings and arrangements of the same, but also other forms of multiple-row ball bearings and ball bearing arrangements in the above-described manner with cages. In particular, application on multiple-row arrangements of deep-groove ball bearings and spindle bearings is conceivable.

Even multiple, separately produced ball bearings or angular-contact ball bearings, which are arranged, for example, on a shaft one behind the other so as to be directly adjoining, can be provided with cages in the manner described here, the design of the bearing rings of the adjoining ball bearings or angular-contact ball bearings being able to be selected in dependence on the area of application of the ball bearing arrangement and not being restricted to the shaping of the bearing rings shown in the exemplary embodiments.

LIST OF REFERENCES

1 Multiple-Row Ball Bearing Arrangement
2 Inner Bearing Ring
3 Outer Bearing Ring
4 Raceway (Outer Bearing Ring)
5 Raceway (Inner Bearing Ring)
6 Raceway (Outer Bearing Ring)
7 Raceway (Inner Bearing Ring)
8 End Face
9 End Face
10a First Ball Row
10b Second Ball Row
11a Ball (First Ball Row)
11b Ball (Second Ball Row)
12a Mid-Point (Ball)
12b Mid-Point (Ball)
13a Radius (Ball, First Ball Row)
13b Radius (Ball, Second Ball Row)
14a First Cage
14b Second Cage
15a First Cage Side Ring (First Cage)
15b First Cage Side Ring (Second Cage)
16a Second Cage Side Ring (First Cage)
16b Second Cage Side Ring (Second Cage)
17a Web (First Cage)
17b Web (Second Cage)
18a Pocket (First Cage)
18b Pocket (Second Cage)
19a Circumferential Section (First Cage Side Ring, First Cage)
19b Circumferential Section (First Cage Side Ring, Second Cage)
20a Circumferential Section (Second Cage Side Ring, First Cage)
20b Circumferential Section (Second Cage Side Ring, Second Cage)
21a Graduated Circle (First Ball Row)
21b Graduated Circle (Second Ball Row)
22a Graduated Circle Surface (First Ball Row)
22b Graduated Circle Surface (Second Ball Row)
23a Axial Defining Surface (First Cage)
23b Axial Defining Surface (Second Cage)
24a Axial Defining Surface (First Cage)
24b Axial Defining Surface (Second Cage)
25a Defining Surface (Pocket, First Cage)
25b Defining Surface (Pocket, Second Cage)
26a Section of a Spherical Surface
26b Section of a Spherical Surface
27a Section of a Spherical Surface
27b Section of a Spherical Surface
28a Section of a Cylindrical Surface
28b Section of a Cylindrical Surface
29a Section of a Cylindrical Surface
29b Section of a Cylindrical Surface
30a Edge
30b Edge
31a Edge
31b Edge
32a Point
32b Point
33a Point
33b Point
34a Point
34h Point
35a Circle
35b Circle
36a Recess
36b Recess
Clearance between Rows
AX Axial Direction and Longitudinal Axis
α Half an Angular Aperture

The invention claimed is:

1. A multiple-row ball bearing arrangement, comprising:
at least one inner bearing ring;
at least one outer bearing ring, which is arranged coaxially to the inner bearing ring on a longitudinal axis;
a plurality of balls, which are arranged between the inner bearing ring and the outer bearing ring in at least one first ball row and one second ball row, which is adjacent the first ball row;
a first cage for guiding the balls of the first ball row; and
a second cage for guiding the balls of the second ball row,
wherein the first cage and the second cage each have a first cage side ring and a second cage side ring,
wherein the first cage side ring of the first cage and the second cage side ring of the second cage are adjacent each other and are arranged so as to overlap at least in sections along the longitudinal axis, and
wherein a clearance between the first ball row and the second ball row, measured in a direction of the longitudinal axis, between a mid-point of one of the balls of the first ball row and a mid-point of one of the balls of the second ball row, is smaller than a sum of radii of the one of the balls of the first ball row and the one of the balls of the second ball row.

2. The multiple-row ball bearing arrangement as claimed in claim 1, wherein the first cage and/or the second cage each have a plurality of webs, which connect the first and second cage side rings associated with the first cage and the second cage respectively in such a manner that a circumferential section of the first cage side ring and a circumferential section of the second cage side ring are defined for accommodating the balls.

3. The multiple-row ball bearing arrangement as claimed in claim 2, wherein the first cage and the second cage have a pocket with a defining surface that faces one of the balls accommodated in the pocket, and the pocket is formed from sections of a conical surface and sections of a cylindrical surface which are connected together.

4. The multiple-row ball bearing arrangement as claimed in claim 3, wherein a region of a pocket of the first cage and/or second cage has a three-point snap-type device for holding the balls in the pocket, the three-point snap-type device is formed by two points of the first cage side ring and by one point of the second cage side ring, and the three-point snap-type device allows the balls to be inserted into the pocket by resilient deforming in a region of the two points of the first cage side ring and the one point of the second cage side ring.

5. The multiple-row ball bearing arrangement as claimed in claim 2, wherein the circumferential section of the first cage side ring and the circumferential section of the second cage side ring of the first cage and/or second cage are arranged completely on different sides of a graduated circle surface of the ball now associated with the cage and do not touch the graduated circle surface.

6. The multiple-row ball bearing arrangement as claimed in claim 2, wherein the circumferential section of the first and the second cage side rings of the first cage and/or second cage are arranged substantially opposite each other with reference to a mid-point of a ball of the ball row associated with the cage.

7. The multiple-row ball bearing arrangement as claimed in claim 2, wherein the circumferential section of the first cage side ring of the first cage and the circumferential section of the second cage side ring of the second cage are both arranged completely on a same side of a graduated circle surface of the first ball row and are both arranged completely on a same side of a graduated circle surface of the second ball row.

8. The multiple-row ball bearing arrangement as claimed in claim 1, wherein the first ball row has a graduated circle and the second ball row has a graduated circle and the graduated circle of the second ball row has a larger diameter than the graduated circle of the first ball row.

9. The multiple-row ball bearing arrangement as claimed in claim 1, wherein the cage side rings of the first and of the second cage have an annulus shape, and the first cage side ring of the first cage has a larger inner diameter and a larger outer diameter than the second cage side ring of the first cage and/or the first cage side ring of the second cage has a larger inner diameter and a larger outer diameter than the second cage side ring of the second cage.

10. The multiple-row ball bearing arrangement as claimed in claim 9, wherein the first cage side ring of the first cage has an inner diameter which is larger than the outer diameter of the second cage side ring of the second cage.

11. The multiple-row ball bearing arrangement as claimed in claim 1, wherein at least one of:
the first cage side ring of the first cage has an axial defining surface which points in a direction of the second ball row and forms part of a toroidal surface, and
the second cage side ring of the second cage has an axial defining surface which points in a direction of the first ball row and forms part of another toroidal surface.

12. The multiple-row ball bearing arrangement as claimed in claim 1, wherein the multiple-row ball bearing arrangement is a multiple-row angular-contact ball bearing or a tandem arrangement having a plurality of single-row angular-contact ball bearings.

13. The multiple-row ball bearing arrangement as claimed in claim 1, wherein the multiple-row ball bearing arrangement is a two-row tandem angular-contact ball bearing.

14. The multiple-row ball bearing arrangement as claimed in claim 1, wherein the multiple-row ball bearing arrangement is a tandem arrangement having two, single-row angular-contact ball bearings.

15. The multiple-row ball bearing arrangement as claimed in claim 1, wherein the balls of the first ball row have a diameter which is different from a diameter of a balls of the second ball row.

16. A single-row or multiple-row ball bearing arrangement, comprising:
at least one inner bearing ring;
at least one outer bearing ring, which is arranged coaxially to the inner bearing ring on a longitudinal axis;
a plurality of balls, which are arranged between the at least one inner bearing ring and the outer bearing ring in at least one ball row;
at least one cage for guiding the balls, the cage having a first cage side ring, a second cage side ring, a plurality of webs, which connect the first cage side ring and the second cage side ring to form pockets for accommodating the balls, the pockets being defined by two adjacent webs, one circumferential section of the first cage side ring and one circumferential section of the second cage side ring, the circumferential section of the first cage side ring and the circumferential section of the second cage side ring of the cage are arranged completely on different sides of a graduated circle surface of the ball row associated with the cage and do not touch the graduated circle surface; and
a three-point snap-type device for holding the balls in the pockets provided in a region of a pockets of the cage, the three-point snap-type device being formed by two points of the first cage side ring and by one point of the second cage side ring, and the three-point snap-type device allowing the balls to be inserted into the pocket through resilient deforming in the region of the two points of the first cage side ring and of the one point of the second cage side ring.

17. A multiple-row ball bearing arrangement, comprising:
at least one inner bearing ring;
at least one outer bearing ring, which is arranged coaxially to the inner bearing ring on a longitudinal axis;
a plurality of balls, which are arranged between the inner bearing ring and the outer bearing ring in at least one first ball row and one second ball row, which is adjacent the first ball row;
a first cage for guiding the balls of the first ball row; and
a second cage for guiding the balls of the second ball row,
wherein the first cage and the second cage each have a first cage side ring and a second cage side ring,
wherein the first cage side ring of the first cage and the second cage side ring of the second cage are adjacent each other and are arranged so as to overlap at least in sections along the longitudinal axis;
wherein the first cage and/or the second cage each have a plurality of webs, which connect the first and second cage side rings associated with the first cage and the second cage respectively in such a manner that a circumferential section of the first cage side ring and a circumferential section of the second cage side ring are defined for accommodating the balls, and
wherein the circumferential section of the first cage side ring of the first cage and the circumferential section of the second cage side ring of the second cage are both arranged completely on a same side of a graduated circle surface of the first ball row and are both arranged completely on a same side of a graduated circle surface of the second ball row.

18. A multiple-row ball bearing arrangement, comprising:
at least one inner bearing ring;
at least one outer bearing ring, which is arranged coaxially to the inner bearing ring on a longitudinal axis;
a plurality of balls, which are arranged between the inner bearing ring and the outer bearing ring in at least one first ball row and one second ball row, which is adjacent the first ball row;
a first cage for guiding the balls of the first ball row; and
a second cage for guiding the balls of the second ball row,
wherein the first cage and the second cage each have a first cage side ring and a second cage side ring,
wherein the first cage side ring of the first cage and the second cage side ring of the second cage are adjacent each other and are arranged so as to overlap at least in sections along the longitudinal axis;
wherein the first cage and/or the second cage each have a plurality of webs, which connect the first and second cage side rings associated with the first cage and the second cage respectively in such a manner that a circumferential section of the first cage side ring and a circumferential section of the second cage side ring are defined for accommodating the balls, and
wherein the first cage and the second cage have a pocket with a defining surface that faces one of the balls accommodated in the pocket, and the pocket is formed from sections of a conical surface and sections of a cylindrical surface which are connected together.

19. The multiple-row ball bearing arrangement as claimed in claim 18, wherein a region of a pocket of the first cage and/or second cage has a three-point snap-type device for holding the balls in the pocket, the three-point snap-type device is formed by two points of the first cage side ring and by one point of the second cage side ring, and the three-point snap-type device allows the balls to be inserted into the pocket by resilient deforming in a region of the two points of the first cage side ring and the one point of the second cage side ring.

* * * * *